United States Patent [19]
Stout et al.

[11] 3,918,430
[45] Nov. 11, 1975

[54] SOLAR HEATING SYSTEM AND COMPONENTS THEREOF

[76] Inventors: Harry E. Stout; Brian Stout, both of 2 Brastow Ave., Somerville, Mass. 02134

[22] Filed: July 17, 1974

[21] Appl. No.: 489,150

[52] U.S. Cl. ................ 126/271; 237/1 A; 165/170
[51] Int. Cl.² ............................................. F24J 3/02
[58] Field of Search ............ 126/270, 271; 237/1 A; 34/93; 165/135, 136, 170

[56] References Cited
UNITED STATES PATENTS

| | | | |
|---|---|---|---|
| 3,146,774 | 9/1964 | Yellott | 126/271 |
| 3,215,134 | 11/1965 | Thomason | 126/271 |
| 3,236,294 | 2/1966 | Thomason | 126/271 |

FOREIGN PATENTS OR APPLICATIONS

| | | | |
|---|---|---|---|
| 822,768 | 10/1959 | United Kingdom | 126/271 |

*Primary Examiner*—Kenneth W. Sprague
*Assistant Examiner*—James C. Yeung
*Attorney, Agent, or Firm*—Morse, Altman, Oates & Bello

[57] ABSTRACT

A light weight, low cost, solar heating system is provided for use with homes and other buildings. Solar heating panels are mounted on a roof or other support and connected to the building's heating system. Water or other liquid medium is pumped to the elevated upper end of each unit and is allowed to drain down through each panel by gravity feed back into a storage tank where the heated water is circulated, on demand, through the building. Each heating panel is comprised of a rigid foam plastic frame having a back wall over which is disposed a reflective stratum. A sheet of plastic material having a black surface is bonded to the reflective stratum along spaced parallel lines to define a plurality of parallel channels extending lengthwise of the panel. Manifolds are provided at opposite ends of the panel to feed water into and drain water from the channels. Spaced layers of flexible, transparent plastic film are mounted to the frame across the front of the panel to pass radiant heat from the front to heat water in the channels and trap the heat absorbed by the panel.

3 Claims, 4 Drawing Figures

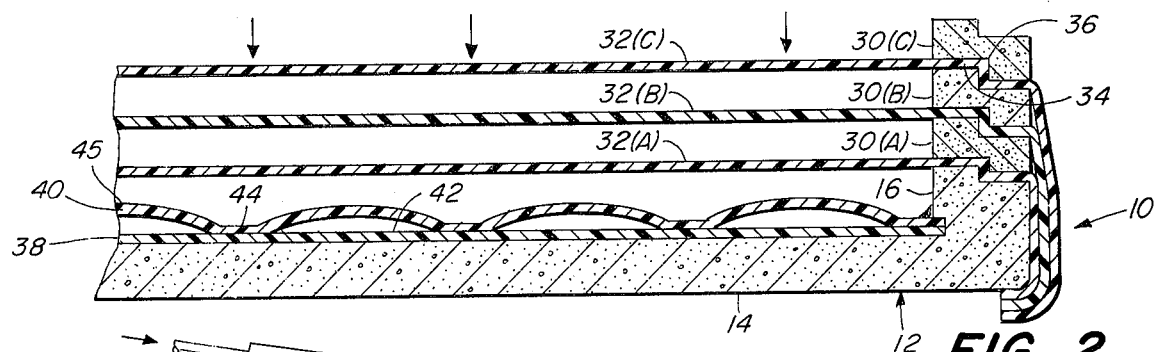
FIG. 2
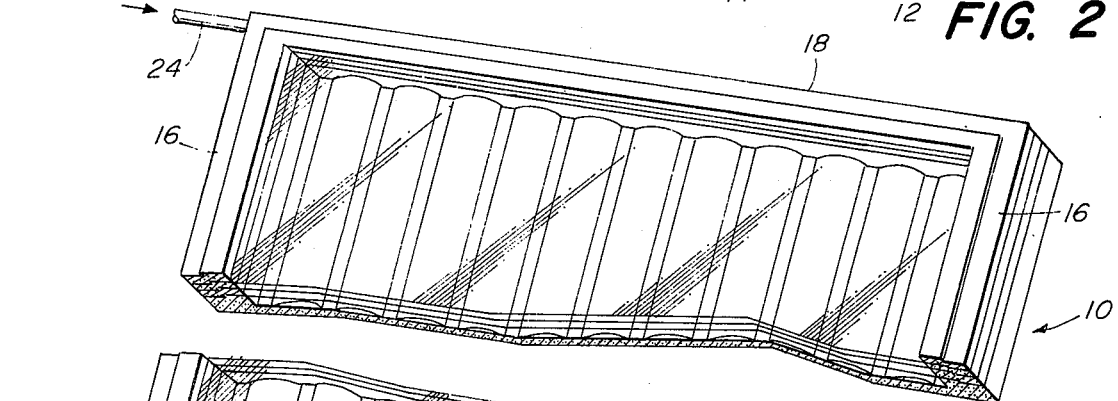
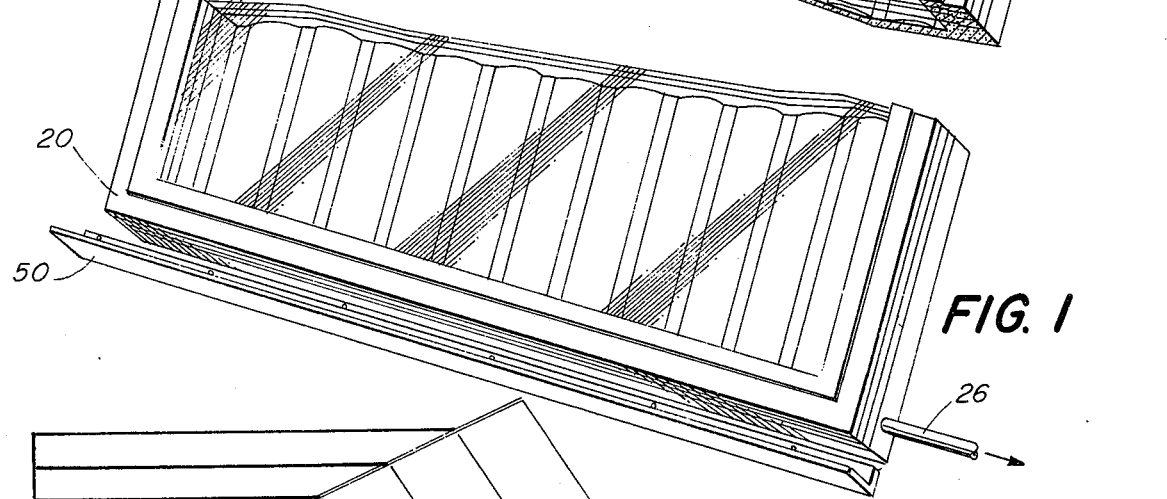
FIG. 1
FIG. 3
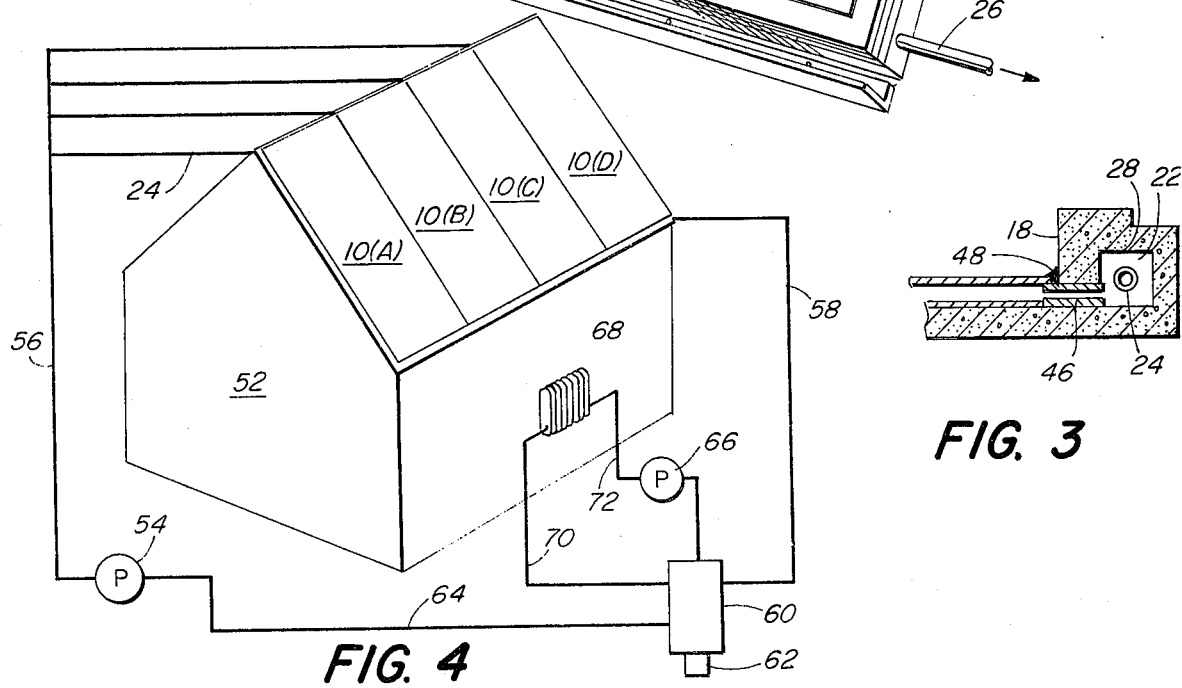
FIG. 4

SOLAR HEATING SYSTEM AND COMPONENTS THEREOF

BACKGROUND OF THE INVENTION

1. Field of the Invention

This invention relates generally to solar heating systems and more particularly is directed towards a new and improved, solar heating system employing simple, low cost light weight heating panels mountable to the roof of a building or the like.

2. Description of the Prior Art

With the increasing cost of heating fuels as well as the increase experienced in the cost of generating electricity, a greater interest has developed in providing alternate sources of energy, particularly for heating homes and other buildings. Solar heating systems are of particular interest since the sun provides a substantially unlimited source of free energy and various types of solar heating panels have been developed which utilize the sun's rays to heat water or the like with the water, in turn, serving to heat the building which the panels are associated. While solar heat systems of this type have functioned successfully, the high initial capital cost of systems presently available have prevented widespread use of such systems. Also, for the most part, present solar heating systems have required specially designed buildings involving relatively large, expensive and complex components.

Accordingly, it is an object of the present invention to provide a new and improved solar heating system adapted for easy installation on existing buildings. Another object of this invention is to provide a simple, low-cost light weight solar heating system which is compatible with existing structures and heating systems and which may be quickly and easily installed by relatively unskilled workmen.

SUMMARY OF THE INVENTION

This invention features a solar heating system, comprising at least one solar panel fabricated with a light weight frame of a rigid foam plastic material having a back wall and shallow marginal side walls extending about the edges thereof. A reflective stratum is applied over the inner face of the back wall and a layer of waterproof moldable plastic material is bonded to the reflective layer along spaced parallel lines to define a plurality of parallel water channels between the plastic material and the reflective backing. Transparent plastic film is mounted across the frame opening in spaced parallel layers to trap heat generated by radiant energy from the sun passing through the film to heat the water in the channels. The outer face of the plastic material forming the water channels is black to enhance heat absorption. Manifolds are provided in the frame at opposite ends of channels by which water is delivered at one end and drained by gravity from the other end. A pumping system is provided for circulating water and a storage tank is connected to the pumping system to store water heated thereby.

BRIEF DESCRIPTION OF THE DRAWINGS

FIG. 1 is a view in perspective of a solar heating panel made according to the invention, FIG. 2 is a fragmentary sectional view showing details of the panel construction.

FIG. 3 is a view somewhat similar to FIG. 2 showing further details of the panels, and, FIG. 4 is a view in perspective, somewhat schematic, of a typical heating system employing panels of the present invention.

DETAILED DESCRIPTION OF THE PREFERRED EMBODIMENT

Referring now to the drawings, the reference character 10 generally indicates a solar heating panel made according to the invention and generally organized about a rectangular frame 12 of a light weight, thermally insulating, inexpensive, material. Preferably the frame 12 is molded from styrofoam or other rigid, foam plastic material which is light in weight, inexpensive yet structurally strong and having excellent thermal insulation characteristics. The frame 12 is of a rectangular configuration formed with integral, relatively short surrounding side walls 16. The dimensions of the frame 12 may be varied over a wide range depending upon particular applications. Typically, the panels are made up of rather long sections on the order of perhaps 10' to 20' and in width on the order of perhaps 3' or so. The dimensions are not critical but rather may be in a wide range. The wall 14 should be relatively thick to provide good thermal insulation for the unit. In this regard, styrofoam is particularly effective as a thermal insulator in addition to its advantageous structual characteristics. The wall 14 may be ½ inch or so in thickness to provide both strength and proper insulating protection for the panel. The side wall 16 is relatively thick being on the order of 1-½ to 2 inches both in height and width to reinforce the assembled panels as well as to provide a clearance of possibly ¾ inch between the inner face of the wall 14 and the top of the wall 16 for reasons that will presently appear. The side walls 16 extend the full length of the panel 10. End walls 18 and 20 are formed integral with the frame across the full width of the panel and are of the same height as the side walls 16. The end walls 18 and 20 are hollow to form a manifold chamber 22 for commuinication with an inlet conduit 24 for the wall 18 and an outlet conduit 26 for the wall 20.

The walls 16, 18 and 20, in the preferred embodiment, are formed with a groove or recessed portion 28 extending about the upper outer edges of the walls to receive in nesting engagement stacked spacers 30(a), (b), and (c), mounted one on top of the other over the walls 16, 18 and 20 to provide a predetermined spacing between multiple layers of transparent film 32 (a), (b), and (c). The function of the multiple layers of transparent film 32 is to transmit radiant energy from the sun into the solar heating panel 10 while insulating the panel against heat losses through conduction and convection. In the preferred form of the invention, the film layers 32 are spaced apart from one another by a distance of approximately ½ inch and, ideally, are two or three in number. The spacers 30 are of matching size and configuration having a length and width corresponding to that of the panel 10 and formed about its inner lower corner with a recess 34 adapted to nest with the recess 28 of the walls 16, 18 and 20 as well as with a recess 36 formed about the upper outer edges of each of the spacers.

In fabricating the panels, the film layers 32 are stretched over the frame walls 16, 18 and 20 to a relatively taut and smooth surface. In practice, the innermost film layer 32 (a) is first placed in position and securely bonded to the frame 14. One mode of assembly that has been found to be particularly satisfactory is the use of heat shrinking techniques involving thermoplastic films by which the films are shrunk tightly onto the frame. Once the first layer 32 (a) is in position, the spacer 30 (a) is mounted over the walls 16, 18 and 20 and the second transparent film 32 (b) is applied. The same operation is repeated for the next spacer 30 (b) and the film layer 32 (c). A final optional spacer 30 (c) may be applied to form a protective member about the assembled structure. Various types of films may be employed and should be selected according to their light transmission characteristics, durability, weathering characteristics, bonding qualities and the like. Various types of polyethelyne, PVC, and other plastic films are suitable for this purpose. The spacers 30, preferably of the same material as the frame 14, are readily moldable from styrofoam or other relatively rigid foam plastic material which is light in weight, structurally strong and displays excellent thermal insulating characteristics.

Within the solar panel there is disposed a reflective stratum 38 applied to the upper face of the frame wall 14 and, for this purpose, aluminized plastic, aluminum foil or other high reflective material, including aluminized paint, may be employed. The reflective stratum 38 covers the entire surface of the frame wall 14 and forms with a ply 40 a plurality of spaced, parallel, water channels 42 disposed lengthwise across the width of the solar panel. The ply 40, in the preferred form of the invention, is a moldable plastic material such as PVC or the like and is relatively light in weight, waterproof and preferably adapted for thermal-forming techniques. The ply 40 is bonded along seams 44 extending in parallel longitudinal relation to the stratum 38, as best shown in FIG. 2. Typically, the bonding seams 44 are about ⅜ inch wide with the channels 42 being about 4 inches in width. As shown in FIG. 2, the ply 40 between the seams is raised somewhat from the face of the reflective stratum and typically an elevation of perhaps ⅛ inch provides adequate flow of water. The function of the channels is to form water into a relatively thin stream to facilitate heat transfer. In this regard, the ply 40 should be a black body and is either of and entirely black material or has its surface coated as at 45 with a dull black substance which will readily absorb the radiated heat from the sun. The combination of the black body absorption characteristics of the ply 40 along with the reflective characteristics of the stratum 38 causes rapid heating of water flowing through the channels 42. On a typical sunny day, temperatures on the order of 225° to 250°F are obtainable within a relatively short period of time.

Each of the water channels 42 communicates with the manifold chambers 22 in the upper and lower end walls 18 and 20 as by tubes 46 (FIG. 3) extending between the chambers 22 and into the ends of the water channel. A fillet 48 of sealing compound may be applied along the joints to prevent leakage.

In practice, each solar panel is mounted in a tilted position with the end wall 18 raised above the end wall 20 in the manner shown so that water fed into the upper manifold through the conduit 24 will flow by gravity down through the water channels 42 into the manifold of the end wall 20 and drain out through the conduit 26. Typically, the solar panels are mounted on a pitched roof in the manner suggested in FIG. 4 and a number of panels may be installed depending upon the particular requirements of the building. Since each solar panel is relatively light in weight and easily handled, it may be nailed onto an existing roof without the need of reinforcement or extra support. Nails can be readily driven through the side walls of each panel or the unit may be cemented onto the roof. Preferably, an angle iron 50 is secured to the lower end of a pitched roof to provide support for the solar panel against slipping.

A system utilizing the solar panels is illustrated in FIG. 4 and, in the illustrated embodiment, four solar panels 10 (a), (b), (c) and (d) are mounted to a pitched roof of a building 52 with the panels extending from the peak of the roof down to the eaves. Feed water is delivered by means of a pump 54 to a conduit 56 through branch lines 24 into the manifold 22 at the upper end of each solar heating panel. The relatively cool water flows by gravity down through the channels 42 in the heating panels becoming heated in the process and drains out through a drain line 58 down into a collecting tank 60, preferably within the building. The outlet conduits 26 may interconnect with the drain manifolds of adjacent panels with the last connected to the line 58. The tank 60 should be well insulated and, preferably, is provided with an auxiliary heater 62 which may be electrical, oil fired, gas fired or the like. The auxiliary heater is for use whenever heating requirements are not met by the solar heating system as may occur after a number of cloudy days in succession. The pump 54 is connected by a conduit 64 to the tank 60 and recirculates the water through the system. The heated water in the tank 60 is removed by means of a pump 66 which circulates the heated water through the heating system of the building. The heating system may be preexisting and may include a number of radiators 68 connected by conduits 70 and 72 to the tank 60. For purposes of illustration, only a single radiator and simple heating system are shown. Obviously, a more complex system may be utilized.

While water has been indicated as the heat transfer medium, obviously a wide variety of liquids and liquefiable materials may be used in the system. For example, alcohol, salt water, liquid hydrocarbons, salt solutions and various other heat transfer media may be employed in the system.

Having thus described the invention what we claim and desire to obtain by Letters Patent of the United States is:

1. A solar heating panel, comprising
   a. a frame of rigid foam plastic material formed with a flat rear wall and integral marginal side and end walls extending from one face and along the edges thereof,
   b. a relective stratum disposed over said one face of said rear wall in flush face to face contact therewith,
   c. a ply of waterproof plastic black body material bonded to said stratum along spaced parallel lines extending lengthwise of said panel to form a plurality of elongated, parallel thin and relatively flat channels between said end walls,
   d. said end walls being hollow and communicating with said channels,
   e. conduit means connected to said end walls for delivering a liquid medium into one end wall, through said channels and from the other end wall, and
   f. a plurality of strata of transparent plastic flexible sheet material mounted to said side and end walls in spaced parallel relation to one another and to said rear wall, and, g. spacer members of rigid foam plastic material mounted along said side and end walls between each stratum of sheet material.

2. A solar heating panel according to claim 1 wherein said sheet material is heat shrinkable and each stratum of material is heat shrunk over said panel and said spacer members to connect said panel, spacer members and strata into a sealed unit.

3. A solar heating panel according to claim 1 wherein said side and end walls are formed with a marginal recess along their upper outer edges and each of said spacer members is formed with a cooperating recess along its lower inner edges for mating engagement with the recess of said side and end walls and another recess along its upper outer edges for mating engagement with a similar spacer member nested thereon.

* * * * *